May 27, 1969   J. H. WURSTER   3,447,048
ELECTRIC CAPACITOR WITH EXTENDED WICKING
Filed April 14, 1967   Sheet 1 of 2

INVENTOR:
JOHN H. WURSTER,
BY *James J. Lickiello*
HIS ATTORNEY.

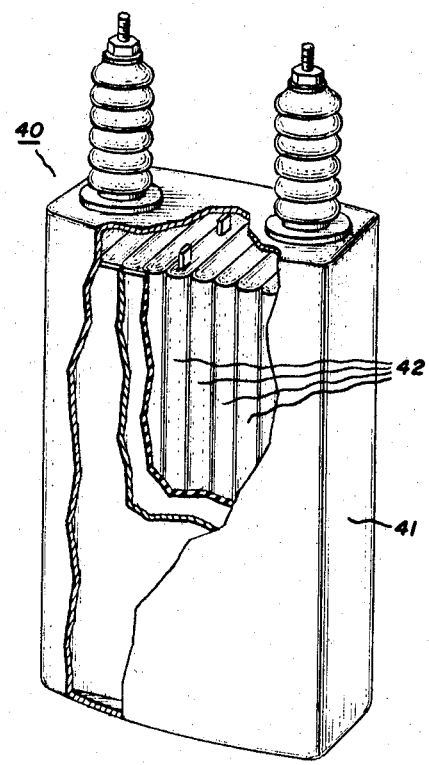

United States Patent Office 3,447,048
Patented May 27, 1969

3,447,048
ELECTRIC CAPACITOR WITH
EXTENDED WICKING
John Henby Wurster, Glens Falls, N.Y., assignor to
General Electric Company, a corporation of New
York
Filed Apr. 14, 1967, Ser. No. 631,047
Int. Cl. H01g 3/21
U.S. Cl. 317—258          16 Claims

ABSTRACT OF THE DISCLOSURE

A roll-type capacitor including alternate strips, layers or sheets of a dielectric material and electrode material wherein one or more adjacent dielectric sheets may be of a synthetic resin, for example, a polyolefin material such as polypropylene. A further sheet of a dielectric material such as paper is inserted between a pair of adjacent resin sheets or between a resin sheet and another adjacent sheet. The paper material sheet is significantly wider than the resin sheet so that the paper sheet projects or extends beyond the resin sheet at the exposed edges of the capacitor roll.

This invention relates to improved capacitors comprising alternate sheets or layers of a synthetic resin dielectric material and foil-type electrodes, and more particularly to dielectric liquid impregnated roll-type capacitors of the foregoing description wherein a paper type wicking dielectric sheet is utilized adjacent a resin sheet in contiguous contact therewith and extending to a greater axial distance at the exposed edge of the roll than the resin sheet.

Roll-type capacitors may employ one or more dielectric sheets between foil armatures or electrodes, and these sheets may be in contact with each other as well as in contact with the foil-type electrodes. An example of a single synthetic resin dielectric sheet between electrode foils is disclosed in 3,292,061—Eustance, assigned to the same assignee as the present invention.

Some roll-type capacitors utilize a plurality of contiguous synthetic resin dielectric sheets between foil sheet electrodes where the exposed surfaces of the resin sheets engage the foil electrode sheets. One example of a roll-type capacitor utilizing a plurality of adjacent dielectric sheets which may be of a synthetic resin material is found in U.S. Patent 2,983,856—Martin et al., also assigned to the same assignee as the present invention.

Other roll-type capacitors which utilize a plurality of synthetic resin dielectric sheets between adjacent foil electrode sheets sometimes include a wicking sheet usually of kraft paper between adjacent resin sheets. One example of this type of capacitor is found in U.S. Patent 2,864,982 —Ruscetta, assigned to the same assignee as the present invention, and disclosing as one example a dielectric comprising a pair of polyethylene terephthalate sheets with an intermediate sheet of paper.

An important problem associated with dielectric liquid impregnated capacitors, and particularly roll-type capacitors as above described, relates to the difficulty of fully impregnating the rather tightly wound capacitor roll with a dielectric liquid impregnant. Thin films of a number of the synthetic resins, particularly the polyolefins, and polypropylene specifically, tend to be self-adhesive, and contacting adjacent sheets or portions of adjacent sheets in the roll stick together or stick to the foil electrode so that the dielectric liquid impregnant cannot readily pass therebetween to fully impregnate the roll. This sticking or clinging tendency is sometimes referred to as "blocking." In the mentioned Ruscetta et al. patent, adjacent resin sheets are separated by a wicking sheet usually of kraft paper to alleviate, as one advantage of paper usage, some of the impregnating problems. However, this practice has not been found fully effective for a number of reasons. For example, at the elevated temperatures utilized for the impregnating process, polyolefin resins, and particularly polypropylene, soften somewhat and may expand while paper may shrink or wrinkle to such a degree that along the exposed edges of the roll, the resin sheets overlap the paper wicking sheets and generally stick together to prevent full impregnation of the roll. Furthermore, precise alignment of corresponding film-paper edges as well as matching of film-paper sizes are among the problems leading to overlap and film blocking.

Accordingly, it is an object of this invention to provide an improved capacitor.

It is another object of this invention to provide an improved dielectric liquid impregnated roll capacitor.

It is a further object of this invention to provide improved means of impregnating a roll-type capacitor with a dielectric liquid.

It is yet another object of this invention to provide extended wicking sheets between otherwise contacting adjacent polyolefin resin sheets or portions thereof in a dielectric liquid impregnated roll-type capacitor.

It is yet another object of this invention to provide a trichlorodiphenyl impregnated roll-type capacitor wherein adjacent polypropylene sheets are separated by paper sheets extending axially beyond the polypropylene sheets.

Briefly described, this invention, in one of its preferred forms, includes a roll-type capacitor comprising a pair of outer electrode sheets or strips of a metal foil, for example, and a plurality of intermediate sheets or strips of a synthetic resin, particularly polypropylene from the polyolefin family of resins. Positioned between adjacent polypropylene sheets is an intermediate sheet of a wicking material such as kraft paper which extends laterally a greater distance than the resin sheets along the major axis of the roll, at both edges of the roll. The extension or overlap is substantially continuous along the longitudinal edges of the strips forming the roll.

This invention will be better understood when taken in connection with the following description and the figures in which:

FIGURE 9 illustrates a multiple roll or pack capacitor embodying this invention in a plurality of rolls.

Figure 1:
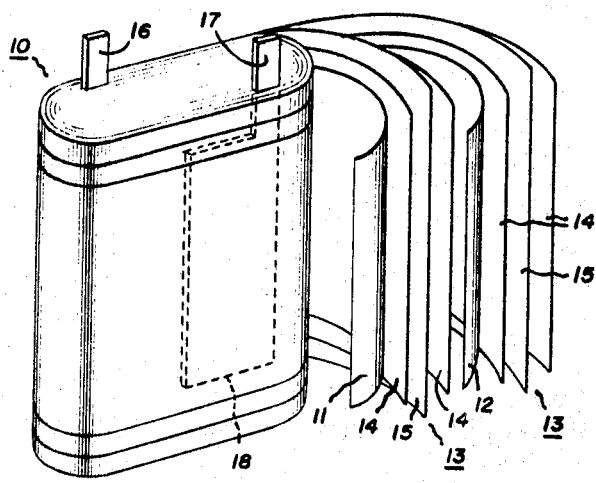
FIGURE 1 illustrates a rolled capacitor section as one preferred form of this invention.

Capacitor assemblies in accordance with the present invention may be constructed and assembled by a number of well-known methods and arrangements, except for the use of the extended wicking material employed. Accordingly, as shown in FIGURE 1 of the drawing, a convolute assembly 10 may be made by winding sheets or strips 11 and 12 of a metal foil such as, for example, aluminum, copper, tantalum, etc. with one or more interleaved dielectric spacers 13. A dielectric spacer 13 comprises a plurality of sheets or strips, at least one of which is a wicking material, and the other of which is a synthetic resin material such as a polyolefin material, for example, polypropylene. In the embodiment shown in FIGURE 1 dielectric spacer 13 includes a pair of outer polypropylene material sheets 14 with an intermediate sheet 15 of a dielectric spacing or wicking material, for example, of a linen or Kraft capacitor paper. The wicking sheet usually has a thickness of, for example, 0.2 mil to about 1 mil as compared to a polypropylene sheet of less than 1.0 mil. One embodiment of this invention utilized polypropylene film of 0.5 mil thickness and kraft paper of 0.3 mil thickness. Electrical contact with the foil sheets 11 and 12 may be made by laid-in tap straps 16 and 17 having their ends protruding from one end of the rolled capacitor assembly. The tap straps may be welded to the foil sheets, if desired, to obtain a better contact, and the lower part of the straps may be enlarged as at 18, to provide a larger contact area with its cooperating foil electrode sheet.

Figure 2:
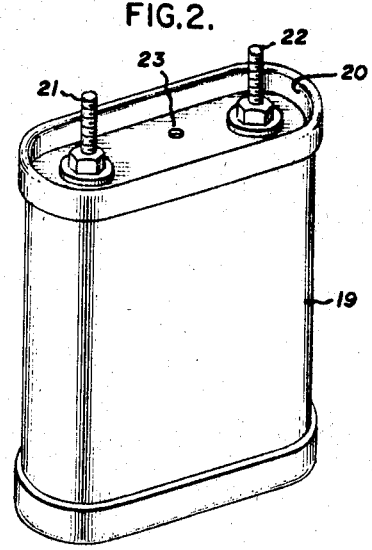
FIGURE 2 illustrates a complete capacitor assembly including a capacitor roll section incorporating this invention.

A preferred form of this invention is directed to roll-type capacitors which incorporate a dielectric liquid impregnant. Prior to impregnation of the capacitor roll by a liquid impregnant such as a chlorinated hydrocarbon, the composite foil electrode spacer assembly 10 is usually placed in a metal vessel such as the container 19, as illustrated in FIGURE 2, and cover 20 is hermetically sealed to the container by a peripheral seam. Before cover 20 is sealed to container 19 contact tap straps 16 and 17 are respectively affixed to terminals 21 and 22 extending through an insulator in cover 20. In order to permit withdrawal of moisture from the encased assembly, and to introduce the liquid impregnating material, a small hole 23 is provided in cover 20.

Before impregnation capacitor assemblies are normally vacuum-dried to remove residual moisture. The drying temperature will vary depending on the length of the drying cycle, but usually ranges from about 60 to about 130° C. With a temperature which is low, the drying period is excessively long while elevated and prolonged temperatures may cause decomposition of the paper component of the dielectric spacer, and deleterious effects on the resin materials employed.

The impregnating material such as trichlorodyphenyl liquid is admitted to the capacitor assembly through hole 23 while the dried assembly is still under vacuum. Usually, enough of the impregnating material is introduced to completely fill the container, and the pressure therein is then raised to atmospheric pressure or above and the assembly allowed to stand to permit thorough penetration of the liquid impregnant into the internal portions of the rolled section. After impregnation, the capacitor unit may be sealed by applying a quantity of suitable solder over hole 23.

An important feature of this invention is the use of the dielectric wicking material sheet 15 having a dimension which is wider than a corresponding dimension of the adjacent polypropylene sheets 14, for example, at the exposed opposite roll edges of roll 10 of FIGURE 1. This extra width or extension beyond the edges of the polypropylene film sheet 15 will prevent, during the impregnation process, the edges of the polypropylene sheet from overlapping the paper sheet and sticking together to prevent full impregnation of the roll. At the same time the extended wicking sheet provides a larger area or entry for the absorption of the dielectric liquid impregnant into the paper and thus more completely throughout the interior of the roll.

The extended wicking also provides a very important advantage in addition to that of facilitating impregnation of the capacitor. In rolled capacitor sections of the kind described, the impregnation process is first preceded by a vacuum and drying process, as above noted, whereby moisture, which is a deterrent to good impregnation, is removed from the capacitor roll. In the use of resin films in adjacent or contiguous contact, there is no real defined passageway or a passage through which moisture may be readily passed, because of the stickiness of the resin films in contiguous or direct contact. Accordingly, the extended wicking of this invention prevents the edges of the adjacent polypropylene films from sticking together and provides a passageway or means through which moisture may progress, to an enlarged external area, which is the extended part of the wicking, and from there moisture is extracted readily. The wicking is particularly advantageous because it permits rapid withdrawal of moisture from the relatively inaccessible central portions of the roll whether from adjacent surfaces or from within the paper wicking itself. The use of extended paper wicking effectively reduces the time of the moisture removal process, while also permitting higher temperatures, which, for shorter periods of time remain non-injurious to the roll materials.

The extended wicking or paper may be utilized, in its extended form, on one or both exposed edges of the roll, and totally or partially over the length of the sheets. As a practical expediency, it has been found most desirable to utilize a paper or wicking sheet, which is coextensive with the polypropylene strip but wider than the polypropylene film sheet at both exposed edges of the roll, and extending throughout the total length of the sheet layers in the roll. The degree of extension may be varied to suit the size of the capacitor roll section. Ordinarily the degree of extension should be within the range of from about the thickness of the paper sheet to be employed extending to a dimension which is practical for the casing involved, which, in the practices of this invention, have extended to about ½ inch. Good results have been obtained in the practice of this invention when the paper sheet extended ¹⁄₁₆ to about ⅛ of an inch on each exposed edge of the roll 10 from the corresponding edge of the film sheets, where impregnating temperatures have been in the range of of about 85° C. to 130° C.

While a preferred form of this invention discloses an extended wicking sheet between plural adjacent and otherwise contiguous synthetic resin sheets, the invention may be advantageously employed in capacitor rolls where the extended wicking sheet is utilized between a foil sheet and a synthetic resin sheet, particularly polypropylene. For example, the extended wicking or spacer sheet is employed in a capacitor section in such a manner that the extending portion at the edge of a capacitor section, such as a roll edge, protrudes from between otherwise contacting portions of resin sheets. Within the roll, however, the wicking sheet may be coextensively adjacent a foil sheet or, in part, adjacent a further wicking sheet, as will be noted in FIGURES 7 and 8. It is more important, however, to provide resin sheet separation at the roll edges for enhanced impregnation and moisture removal.

Figure 3:
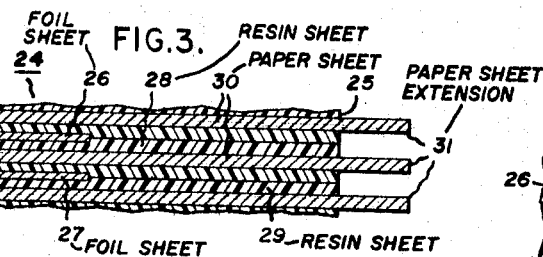
FIGURE 3 is a cross-sectional view of a modification of the roll capacitor of FIGURE 1.

Referring now to FIGURE 3, there is illustrated what is described as an inverted sandwich buried foil, roll-type capacitor. FIGURE 3 illustrates a partial and cross-sectional view of one end of a capacitor roll section 24, generally similar to the illustrated section 10 of FIGURE 1. In FIGURE 3, numeral 25 marks the exposed edge of the roll, in this instance the edge of the resin sheets. Section 24 comprises a pair of electrodes in the form of foil sheets 26 and 27. Between electrodes 26 and 27 there is disposed a laminate dielectric comprising a pair of polypropylene resin film sheets 28 and 29 and an intermediate wicking sheet or layer 30 of a paper material. In this embodiment the width of foil sheets 26 and 27 are substantially less than the width of the paper sheet 30 or the film sheets 28 and 29 so that the edges of the foil sheets 26 and 27, ordinarily the exposed edges, are buried, in a sense, between pairs of adjacent resin film sheets. However, the wicking or extended paper sheet 30 projects beyond the edge 25 of resin film sheets 28 and 29 to provide the extension 31. It is more advantageous to employ a paper sheet in the position indicated as the more preferred position in the illustrated arrangement when a single wicking sheet is to be employed. It is noted in FIGURE 3 that paper extensions 31 protrude from between otherwise contacting edge portions of resin sheets 28 and 29 while at the same time are coextensively in contact with these resin sheets within section 24. However, paper extensions 31 are not found between those resin sheets next adjacent the foil strips.

Figure 4:
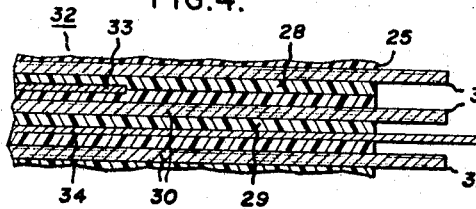
FIGURE 4 is an exposed foil inverted sandwich modification of the invention as illustrated in FIGURE 1.

The modification as illustrated in FIGURE 4 is denoted as exposed foil inverted sandwich. This capacitor section 32 is similar to capacitor section 24 of FIGURE 3. The essential difference in capacitor section 32 is that one of the electrode foil sheets, for example, electrode foil 34, extends laterally beyond the width of the resin sheets or edge 25, and preferably beyond the width of the extension 31 of the extended paper. At the same time the other electrode foil 33 extends at the other exposed edge of the capacitor section 32 in a manner similar to that as described for edge 25.

Figure 5:
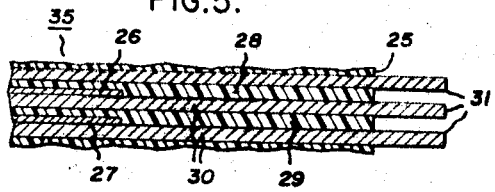
FIGURE 5 is a semi-sandwich buried foil modification of the invention as illustrated in FIGURE 1.

In FIGURE 5, the semi-sandwich buried foil embodiment 35 includes a pair of electrode foils 26 and 27 separated by a polypropylene resin film sheet 29 and an extended paper sheet 30. In this modification, the extended paper sheet 30 separates each pair of film sheets 28 and 29 at the edge 25. However, an extended paper sheet 30 is also adjacent one of the armatures 26 in the central portion of the roll. This arrangement provides an excellent path for the removal of moisture from adjacent a foil sheet, and also a channel for impregnation of the liquid dielectric not only into the paper but also over the innersurface of the foil sheets 26 and 27.

Figure 6:
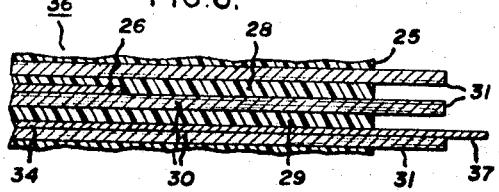
FIGURE 6 is a semi-sandwich exposed foil modification of the invention as illustrated in FIGURE 5.

FIGURE 6 illustrates a modification of the embodiment of FIGURE 5. In FIGURE 6, capacitor section 36 includes an electrode foil sheet 34 which projects beyond the edge 25 of the resin sheets, as noted by foil extension 37. At the same time a paper sheet 30 which is in substantially coextensive contact with foil 34, also extends beyond edge 25, as noted by paper extension 31. In this modification extension 37 of foil strip 34 extends beyond paper extension 31 of paper sheet 30, not only at edge 25, as illustrated, but also at the opposite edge (not shown) for the next electrode, i.e., electrode foil 26. Between any two succeeding electrode foil sheets, as foil strips 26 and 34, and between opposing surfaces thereof, there is a paper sheet 30 in contact with one electrode foil (26) opposing surface. A resin sheet 29 is in contact with the opposing surface of electrode 34, and the remaining surface of paper 30 and resin sheet 29 are in contact with each other. In the FIGURE 6 modification, at the edge thereof, an extended paper portion is disclosed between each adjacent pair of resin sheets.

Figure 7:
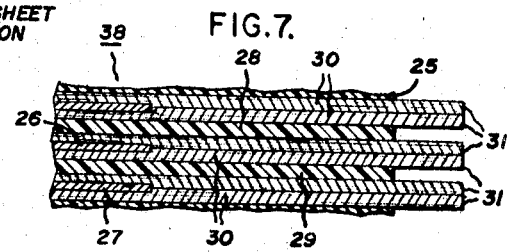
FIGURE 7 is a full sandwich buried foil modification of the invention as illustrated in FIGURE 1.

FIGURE 7 is denoted as a full sandwich buried foil modification 38 of the invention of FIGURE 1. In FIGURE 7, electrode foils 26 and 27 are spaced by a dielectric composite element comprising a pair of paper sheets 30, one in contact with each foil electrode, and an inner resin sheet 29 in contact with each paper sheet 30. Such an arrangement facilitates the removal of moisture from foil surfaces as well as from the paper sheets and provides more complete impregnation over the foil surfaces on each side thereof. At the edge 25 the structure illustrates a pair of adjacent paper sheets 31 between otherwise adjacent resin film edges.

Figure 8:
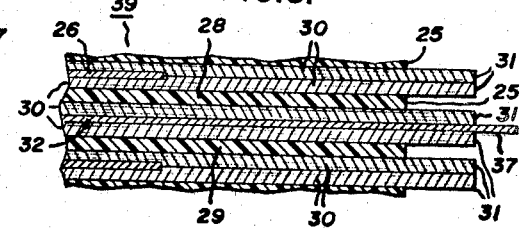
FIGURE 8 is a full sandwich exposed foil modification of the invention as illustrated in FIGURE 7.

FIGURE 8 is referred to as the full sandwich exposed foil modification 39 of the invention of FIGURE 7. In FIGURE 8, a pair of electrode foil sheets 26 and 32 are separated by a dielectric composite including two extended paper sheets 30 and an intermediate polypropylene resin film sheet 28, much in the same manner as described for FIGURE 7. In FIGURE 8, however, foil electrode 32 extends not only beyond the exposed edge of the film at 25, but also beyond the exposed edges of the extended portions 31 of the extended paper 30.

Any of the roll sections of FIGURES 1 and 3 through 8 may be employed as the sole capacitor section in a casing 19 as illustrated in FIGURE 2. This invention, however, is particularly applicable to multiple section or pack capacitors as described, for example, in U.S. Patent 3,219,892—Wurster, assigned to the same assignee as the present invention. As illustrated in FIGURE 9, pack capacitor 40 includes a casing 41 containing therein a plurality of capacitor sections 42. Sections 42 may incorporate any of the modifications of FIGURES 1 and 3 through 8 therein and one or more sections.

The extended paper feature of this invention prevents clinging or blocking of adjacent synthetic resin sheets or adjacent resin sheet edges in capacitor structures, where caused by inherent characteristics of the film or by process requirements. This stickiness otherwise causes a twofold problem of moisture removal and dielectric liquid impregnation. The invention is more particularly applicable to those synthetic resins which have an inherent tendency of sticking or clinging. This problem has been found more evident with polyolefin materials and markedly with respect to thin polypropylene films and trichlorodiphenyl liquid impregnant.

In addition to the noted advantages of extended paper the use of this feature facilitates winding and alignment problems by providing a greater margin of error. At the same time the extended paper provides more electrical insulation at the roll edges preventing arcing between electrodes at their exposed edges. Furthermore, in some capacitors the exposed foil is metallized for electrical lead joining or leads are suitably welded to the foils. The extended paper of this invention provides greater heat dissipation characteristics to prevent exposure of the inner parts of the roll to injurious temperatures during lead attaching processes.

The extended wicking or paper sheet of this invention may be gainfully employed in a number of different capacitor modifications, for example, in the interleaved or stacked capacitor as well as in roll capacitors. It is only necessary to have some exposed edge of a capacitor section include the extended wicking sheet, where the extension is desirably the shorter path to the central portion of the capacitor or to that portion where moisture removal and impregnation are difficult.

While this invention has been disclosed with respect to particular embodiments thereof, numerous modifications may be made by those skilled in the art without departing from its true spirit and scope. Therefore, it is intended that the appended claims cover all such modifications and variations which come within the true spirit and scope of the present invention.

What is claimed as new and desired to be secured by Letters Patent of the United States is:

1. An electrical capacitor section adapted for encasement and impregnation comprising in combination:
   (a) a pair of cooperating electrodes,
   (b) an interposed dielectric spacer between said electrodes,
   (c) said dielectric spacer including a sheet of a synthetic resin material and a sheet of wicking material,
   (d) said wicking sheet and said resin sheet being in direct contact with each other,
   (e) said combination being characterized by having the wicking sheet of a wider dimension than the resin sheet to extend laterally a significant distance beyond opposite exposed edges of and beyond any contact with said resin sheet and substantially continuously along the said exposed edges.

2. An electrical capacitor comprising in combination:
   (a) cooperating electrode foil sheets and dielectric spacers wound in a convolute roll to provide spaced foil sheets with an interposed dielectric spacer and exposed opposite roll edges,
   (b) said interposed dielectric spacer consisting of at least one sheet of a polyolefin material adjacent one sheet of a paper material,
(c) said paper sheet having a width of about ⅛ inch greater than said polyolefin sheet to have a portion thereof extending beyond opposite exposed edges of said roll, beyond contact with said polyolefin sheet,
(d) and a dielectric liquid impregnant in said roll.

3. The invention as recited in claim 2 wherein said polyolefin resin is polypropylene and said impregnant is a chlorinated hydrocarbon.

4. The invention as recited in claim 3 wherein said dielectric spacer includes a paper strip intermediate and in contiguous contact with opposed polypropylene sheets at least at one exposed edge of said roll.

5. The invention as recited in claim 4 wherein said dielectric spacer is engaged by said electrodes within said roll between adjacent electrode sheets.

6. The invention as recited in claim 5 wherein said polypropylene sheets are wider than at least one of said foil sheets to cover one edge thereof in said roll.

7. The invention as recited in claim 5 wherein one of said foil sheets extends beyond said paper sheet.

8. The invention as recited in claim 3 wherein one of said foil electrodes is in contact with said paper sheet and the other electrode is in contact with said resin sheet.

9. The invention as recited in claim 8 wherein said paper sheet and said polypropylene sheet extend beyond the width of said electrode sheets at one exposed edge of said roll.

10. The invention as recited in claim 8 wherein one of said electrodes extends beyond said paper sheet.

11. The invention as recited in claim 3 wherein said composite dielectric spacer includes an extended paper sheet in contact with one of said electrode sheets.

12. The invention as recited in claim 11 wherein said composite dielectric includes an extended paper strip on each side of one of said electrode sheets and in contiguous contact therewith.

13. The invention as recited in claim 11 wherein said paper sheets are wider than said electrode sheets at least at one exposed edge of said roll.

14. The invention as recited in claim 11 wherein said electrode sheet extends beyond said paper strip at least at one exposed edge of said roll.

15. A capacitor comprising in combination:
(a) a casing,
(b) a plurality of discrete elongated capacitor roll sections in said casing,
(c) each of said sections including a pair of spaced electrodes and an intermediate dielectric therebetween:
(1) said dielectric comprising a polyolefin sheet adjacent a paper sheet,
(2) at least one of said sections having said paper sheet of at least about ⅛ inch greater width than said polyolefin sheet to extend beyond both roll edges from between otherwise contacting adjacent polyolefin sheet portions,
(d) and a dielectric liquid impregnant in said sections.

16. The invention as recited in claim 15 wherein said polyolefin is polypropylene and said impregnant is trichlorodiphenyl.

References Cited

UNITED STATES PATENTS

| | | | |
|---|---|---|---|
| 2,935,668 | 5/1960 | Robinson | 317—260 X |
| 3,048,750 | 8/1962 | Netherwood | 317—260 X |
| 3,209,217 | 9/1965 | Innis. | |
| 3,253,199 | 5/1966 | Cozens | 317—260 |
| 3,363,156 | 1/1968 | Cox | 317—260 X |

E. A. GOLDBERG, *Primary Examiner.*

U.S. Cl. X.R.

317—260